(12) United States Patent
Stark

(10) Patent No.: US 8,282,137 B2
(45) Date of Patent: Oct. 9, 2012

(54) END PIECE FOR A CORRUGATED HOSE AND PARTS SET CONTAINING SUCH AN END PIECE

(75) Inventor: Stefan Stark, Effeltrich (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 13/103,316

(22) Filed: May 9, 2011

(65) Prior Publication Data

US 2011/0227333 A1 Sep. 22, 2011

Related U.S. Application Data

(63) Continuation of application No. PCT/EP2010/060005, filed on Jul. 13, 2010.

(30) Foreign Application Priority Data

Jul. 20, 2009 (DE) .......................... 10 2009 027 843

(51) Int. Cl.
F16L 33/00 (2006.01)
(52) U.S. Cl. .......................... 285/239; 285/81; 285/258
(58) Field of Classification Search .................. 285/239, 285/903, 81, 258, 414, 322, 319
See application file for complete search history.

(56) References Cited

U.S. PATENT DOCUMENTS

| 589,216 | A | * | 8/1897 | McKee ......................... 285/239 |
| 3,672,708 | A | * | 6/1972 | Zemberry ..................... 285/315 |
| 4,247,136 | A | | 1/1981 | Fouss et al. |
| 4,575,133 | A | | 3/1986 | Nattel |
| 6,007,110 | A | | 12/1999 | Amatsutsu |
| 7,017,949 | B2 | | 3/2006 | Luft et al. |
| 2004/0094953 | A1 | | 5/2004 | Luft et al. |
| 2004/0178633 | A1 | | 9/2004 | Gehring et al. |

FOREIGN PATENT DOCUMENTS

WO 02/061322 A1 8/2002

OTHER PUBLICATIONS

International Search Report of PCT/EP2010/060005, Dated Oct. 21, 2010.

* cited by examiner

*Primary Examiner* — Aaron Dunwoody
(74) *Attorney, Agent, or Firm* — Laurence A. Greenberg; Werner H. Stemer; Ralph E. Locher

(57) ABSTRACT

An end piece for a corrugated hose contains a bushing having a front region and a rear region opposite of a longitudinal direction. The rear region is located inside the hose in a mounted state of the bushing. The front region has a collar forming a groove for receiving the free end of the hose. The rear region has a plurality of flexible tongues, which have a relief direction that is oriented perpendicular to the longitudinal direction of the bushing and directed toward the outer chamber of the bushing. A portion of the flexible tongues contains a radially projecting detent protrusion for implementing an engagement active in the longitudinal direction of the bushing. A retaining sleeve, received by the bushing with precise fit and, in the mounted state of the end piece, extends in an inner chamber enclosed by the bushing, limits the radial play of the flexible tongue.

17 Claims, 3 Drawing Sheets

END PIECE FOR A CORRUGATED HOSE AND PARTS SET CONTAINING SUCH AN END PIECE

CROSS-REFERENCE TO RELATED APPLICATION

This is a continuation application, under 35 U.S.C. §120, of copending international application No. PCT/EP2010/060005, filed Jul. 13, 2010, which designated the United States; this application also claims the priority, under 35 U.S.C. §119, of German patent application No. DE 10 2009 027 843.5, filed Jul. 20, 2009; the prior applications are herewith incorporated by reference in their entirety.

BACKGROUND OF THE INVENTION

Field of the Invention

The invention relates to an end piece for placing onto a free end of a corrugated hose and to a parts set that contains such an end piece.

Corrugated hoses or corrugated pipes, referred to below in general as corrugated hoses, are used in many places as a protective conduit for an actual service carrier such as, for example, cabling or tubing. Depending on the area of application, corrugated hoses made of a metal or a plastic material are used. While corrugated hoses made of a plastic material are used first and foremost for cable conduits in building technology, in nuclear power technology corrugated hoses made from metal are used first and foremost on account of the radiation load occurring here. During assembly the corrugated hoses are cut to the respective suitable length. When the corrugated hose is severed, sharp edges of cut are created at the free ends of the corrugated hose. These present a risk of injury to the fitter, and can also lead to the cabling that is accommodated by the corrugated hose becoming chafed through at the sharp edges of cut. Apart from building technology and nuclear power technology, this problem also relates to robots and other machines where cabling in a corrugated hose is supplied to a moveable component.

In the area of nuclear power technology, assembly using minimal tooling is also desirable, each tool that has to be brought into the safety area of a nuclear power station involves a considerable amount of time and expenditure spent on safety measures.

SUMMARY OF THE INVENTION

It is accordingly an object of the invention to provide an end piece for a corrugated hose and a parts set containing such an end piece which overcome the above-mentioned disadvantages of the prior art devices of this general type, by which the risks emanating from the sharp-edged free ends of the corrugated hose can be reduced and which can be mounted in a simple manner.

The end piece as claimed in the invention for placing onto a free end of a corrugated hose contains a bushing. The bushing has a front region which faces the free end of the corrugated hose and a rear region which lies opposite the front region in a longitudinal direction of the bushing and, with the bushing in the mounted state, is situated inside the corrugated hose. The front region of the bushing has a collar, which surrounds the free end of the corrugated hose at least partially, projects radially in the direction of an outside space that is not surrounded by the bushing and forms a groove that extends along the periphery of the bushing and opens in the longitudinal direction of the bushing for the at least partial accommodation of the free end of the corrugated hose. The rear region of the bushing lying opposite the front region in the longitudinal direction has a plurality of flexible tongues. The flexible tongues have a direction of relief that is oriented perpendicular to the longitudinal direction of the bushing and is directed in the direction of the outside space of the bushing. At least part of the flexible tongues is provided with at least one radially projecting locking projection that is arranged on an outer surface of the respective flexible tongue facing the outside space for realizing an engagement-behind that is effective in the longitudinal direction of the bushing. The end piece as claimed in the invention also includes a retaining sleeve which is accommodatable by the bushing and, with the end piece in the mounted state—when viewed in the longitudinal direction—extends in at least part of the rear region of the bushing in an inside space that is surrounded by the bushing. The retaining sleeve defines the radial play of the flexible tongues in the direction of the inside space of the bushing.

The structure of the end piece as claimed in the invention is based on the now described considerations.

To protect the cabling accommodated by the corrugated hose and the worker mounting the corrugated hose, the sharp-edged free end of the corrugated hose is covered by a groove of a bushing. It has been recognized that the undulation profile of a corrugated hose provides a simple possibility for fastening the bushing to the corrugated hose in the longitudinal direction. In order to enable a simple tool-free assembly, locking projections that engage in the undulation profile of the corrugated hose have been mounted on spring elements. While the bushing is pushed into the corrugated hose, the resiliently mounted locking projections snap over the individual undulations of the undulation profile until the bushing has obtained the end position thereof. In order to ensure that the end piece is securely held on the corrugated hose, a retaining sleeve is inserted into the bushing, the retaining sleeve preventing the engagement-behind that is present between the locking projections and the undulations of the corrugated hose being released again by the flexible tongues snapping back.

The advantage of the end piece as claimed in the invention is that the end piece can be mounted simply and entirely without any additional tool. In addition, the end piece as claimed in the invention is secured against being inadvertently removed from the corrugated hose, which simplifies the laying of the corrugated hose considerably.

As claimed in a first embodiment, the retaining sleeve is accommodated by the bushing with accuracy of fit. In this case, the retaining sleeve limits the radial play of the flexible tongues to a distance that is smaller than the radial extent of the locking projections in the direction of the outside space of the bushing. In this context, the radial extent of the locking projections is measured between an outer surface of the bushing that is facing the outside space and a free end of the locking projections. Limiting the radial play to the specified value ensures that the locking projection always protrudes out of the outside surface of the bushing. As the outside surface of the bushing preferably abuts directly against the inside face of the corrugated hose, it can be ensured that the locking projections always engage in the undulation of the corrugated hose. The end piece is, therefore, held securely on the corrugated hose.

As claimed in an additional embodiment, the retaining sleeve, proceeding from the rear region of the bushing, extends along an inner surface of the bushing facing the inside space of the bushing as far as into the front region of the bushing. In other words, the bushing is practically completely passed through by the retaining sleeve. This measure contributes to the mechanical stabilization of the bushing; in particular the rear region of the bushing, which consists of a plurality of flexible tongues, is stabilized completely by the retaining sleeve that is present in the interior space of the bushing, which means that reliable securing of the flexible tongues is ensured.

In order to improve the reliability of the end piece further, as claimed in another embodiment, the retaining sleeve is held in the bushing so as not to be displaceable. In this case, it is desirable to secure the retaining sleeve both against displacement in the direction of the rear region and against displacement in the direction of the front region of the bushing.

Displacement of the retaining sleeve in the direction of the rear region of the bushing is prevented by a stop member that is present on the bushing. The stop member ensures that when the retaining sleeve is mounted it is not inadvertently pressed too far into the bushing. In such a case, the securing of the end piece would possibly no longer be guaranteed, the end piece would have to be removed again and the corrugated hose possibly cut to length once again. Such a stop member, therefore, improves the handling of the end piece.

As claimed in another embodiment, the stop member is produced between a projection, which extends at the rear end of the bushing in the radial direction in the direction of the inside space of the bushing, and a free end of the retaining sleeve that faces the rear end of the bushing. In an advantageous manner, the flexible tongues are simultaneously secured by such a stop member along with the retaining sleeve.

The proposed end piece is used to prevent damage to the cabling guided in the corrugated hose. Consequently, the end piece itself should not present any new sources of risk to the guided cabling. For this reason, as claimed in a further development, the projection that extends in the direction of the inside space and an inner surface of the retaining sleeve are terminated in a form locking manner. A sharp edge that faces the inside space can consequently be effectively avoided, it thereby being possible to reduce the risk of damage to the cabling guided in the interior of the corrugated hose. A form-locking connection is one that connects two elements together due to the shape of the elements themselves, as opposed to a force-locking connection, which locks the elements together by force external to the elements.

As an alternative or in addition to the aforementioned measures, the retaining sleeve is secured against displacement in the direction of the rear region of the bushing by a stop member, which is produced between a radially circumferential relief that is present at a front end face of the collar and a flange that is present at the front free end of the retaining sleeve and projects radially in the direction of the outside space. In an advantageous manner, the fitter can easily ascertain whether or not the stop member in question is present. Consequently, the accurate seat of the retaining sleeve can be ascertained by a simple visual check. As claimed in a further development, the end face of the flange and the end face of the collar terminate in a flush manner. The risk of damage to the cabling that leads out of the end piece and the risk of injury to a fitter who handles the corrugated hose once he has placed the end piece onto the corrugated hose can be clearly reduced.

In order to ensure that the end piece is held securely on the free end of the corrugated hose, as claimed in another embodiment, not only should the retaining sleeve be prevented from sliding into the bushing, but the same should also be prevented from sliding out of the retaining sleeve. For this reason, the retaining sleeve is secured against displacement in the direction of the front region of the bushing by an engagement-behind of at least one spring element which is present on the retaining sleeve and engages in a groove that is present on the bushing. Such a structure makes it possible to connect the retaining sleeve to the bushing in the manner of a "click-type connection". As claimed in a further development, the spring element that is present on the retaining bushing has a direction of relief that is directed in the direction of the outside space. The groove that is present in the bushing is, in this case, open in the direction of the inside space. The spring element preferably does not project into the inside space of the retaining sleeve and therefore the spring element does not present any risk either to the cabling guided in the interior space. In order to make it possible to mount the end piece quickly onto the free end of the corrugated hose, as claimed in another embodiment, the groove is admitted into the bushing in a radially circumferential manner. Consequently, the connection between the bushing and the retaining sleeve is rotation-invariant; this simplifies the assembly of the retaining sleeve in a considerable manner.

As claimed in another embodiment, the locking projections have a chamfer, which, beginning at the free ends thereof, extends in the direction of the rear region of the bushing. When the bushing is pushed into the end of the corrugated hose, the locking projections jump from one undulation of the corrugated hose to the next until the end position of the end piece is obtained. Jumping over the undulations when the end piece is inserted into the corrugated hose is made easier by the chamfers provided; removing the same, however, is made more difficult. Consequently, even without the retaining sleeve being inserted into the bushing, the retaining sleeve is secured against inadvertent removal.

The parts set as claimed in the invention contains a corrugated hose and an abovementioned end piece. The extent of the radially projecting locking projections of the end piece in the longitudinal direction of the same is smaller than the free space that is present between adjacent undulations of the corrugated hose—measured on the inner surface of the corrugated hose. In other words, the extent of the locking projections in the longitudinal direction of the end piece is adapted to the inside distances between the undulations of the corrugated hose. Corrugated hose and end piece are, therefore, matched to each other.

This applies to an alternative parts set where the locking projections are dimensioned with accuracy of fit in relation to the aforementioned free space.

As claimed in one embodiment, the collar of the end piece has a radially circumferential outer jacket, which extends in the direction of the rear region of the bushing and defines the groove in the direction of the outside space. The outer jacket is now dimensioned in such a manner that the distance between a bottom of the groove and a free end of the outer jacket is greater than the distance between adjacent undulations of the corrugated hose. The effect of such a structure is that the free end of the corrugated hose is always accommodated by the groove of the collar.

Other features which are considered as characteristic for the invention are set forth in the appended claims.

Although the invention is illustrated and described herein as embodied in an end piece for a corrugated hose and a parts set containing such an end piece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention is described in more detail below with reference to the figures of the drawings. Parts that correspond to each other in this case are provided with identical references.

DETAILED DESCRIPTION OF THE INVENTION

Figure 1:
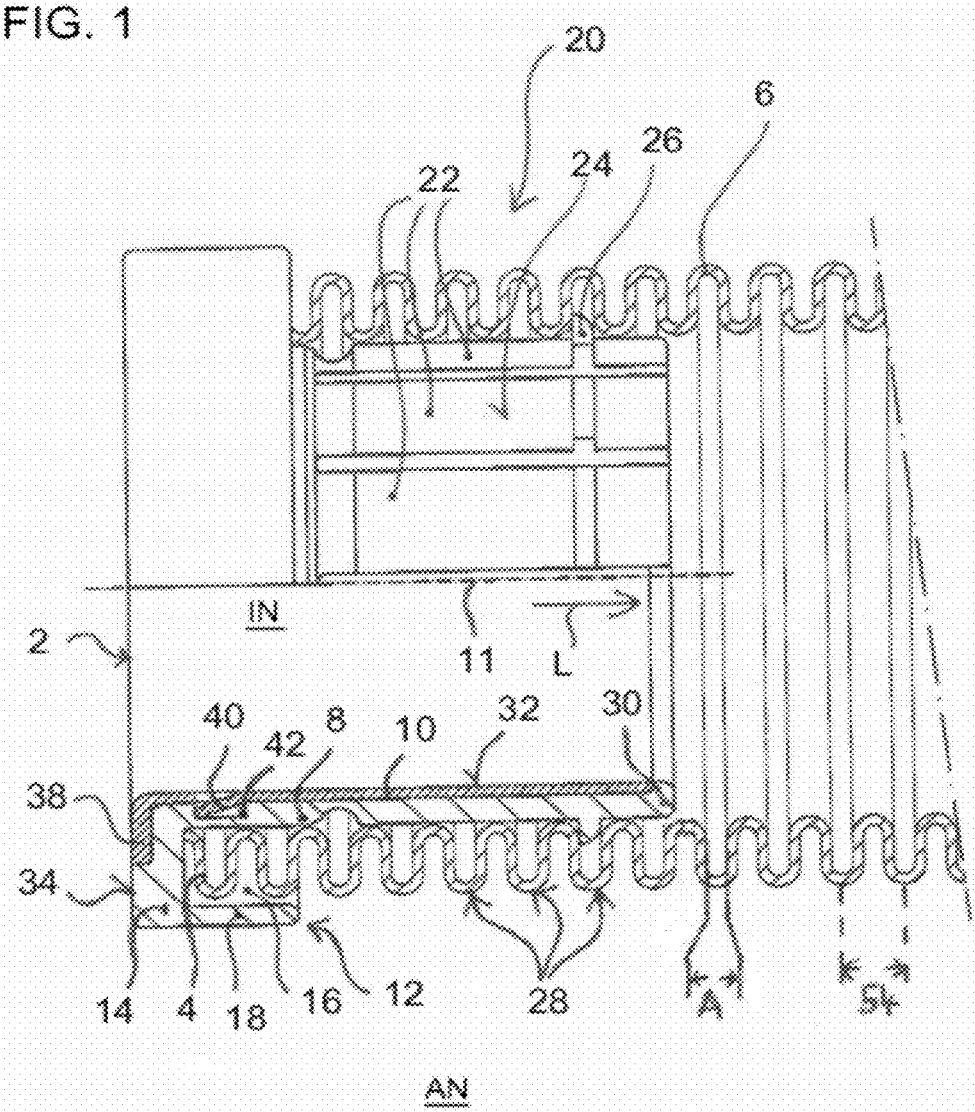
FIG. 1 is a diagrammatic, longitudinal sectional view through a corrugated hose and an end piece represented in each case with one half in a longitudinal section and one half in a top view according to the invention.

Referring now to the figures of the drawing in detail and first, particularly, to FIG. 1 thereof, there is shown an end piece 2, which is placed onto a free end 4 of a corrugated hose 6. The end piece 2 is cut as far as a central axis M thereof, which extends in a longitudinal direction L of the end piece 2, in the half shown at the bottom in FIG. 1 and in the top half is shown in top view. The end piece 2 has a bushing 8 which accommodates a retaining sleeve 10 with accuracy of fit. In a front region 12 of the bushing 8, the bushing has a collar 14 which forms a groove 16 for accommodating the free end 4 of the corrugated hose 6. The groove 16 is defined by an outer jacket 18 in the direction of an outside space AN. In a rear region 20, which is located opposite the front region 12 in the longitudinal direction L of the bushing 8 and, with the end piece 2 in the mounted state, is situated inside the corrugated hose 6, the bushing 8 has a plurality of flexible tongues 22. The flexible tongues 22 have a direction of relief that is directed in the direction of the outside space AN of the bushing 8. Radially projecting locking projections 26 are situated on an outer surface 24 of the flexible tongues facing the outside space AN. By the locking projections 26, an engagement-behind that is effective in the longitudinal direction L is produced between one of the undulations 28 of the corrugated hose 6 and the bushing 8. The bushing 8 surrounds an inside space IN and the retaining sleeve 10 extends in the inside space substantially over the entire length of the bushing 8. The retaining sleeve 10 is used to define a radial play of the flexible tongues 22 in such a manner that the end piece 2 is held securely in the corrugated hose 6. For this purpose, the retaining sleeve 10 is fitted into the bushing 8 with accuracy of fit. It limits the radial play of the flexible tongues 22 in the direction of the inside space IN to a distance that is smaller than the radial extent BR (see FIG. 2) of the locking projections 26 in the direction of the outside space AN of the bushing 8. The radial extent BR of the locking projections 26 is measured proceeding from an outer surface 24 of the flexible tongues 22 facing the outside space AN and a free end of the corresponding flexible tongue 26.

The retaining sleeve 10 is held in the bushing 8 so as not to be displaceable. In principle, it would be possible to ensure the non-displaceability by seating the retaining sleeve 10 in the bushing 8 in a frictionally engaged manner. In the present exemplary embodiment, however, the retaining sleeve 10 is secured against displacement in the direction of the rear region 20 of the bushing 8 by a stop member that is present between the bushing 8 and the retaining sleeve 10. The stop member is situated between a projection 30 that extends radially in the direction of the inside space IN of the bushing 8 and a free end of the retaining sleeve 10 that is in the rear region 20 of the bushing 8. In order to exclude any risk of damage to the cabling guided in the inside space IN of the end piece 2 and the cabling guided inside the corrugated hose 6, an inner surface 32 of the retaining sleeve 10 is terminated in a form locking manner with the projection 30.

There is a further stop member between a relief 36 that is admitted into the front end face 34 of the collar 14 and a radially circumferential flange 38 of the retaining sleeve 10 that projects in the direction of the outside space AN. In order to avoid sharp edges, where possible completely, in this region of the end piece also, the end face 34 of the collar 14 and the end face of the flange 38 terminate in a flush manner.

In order to prevent the retaining sleeve 10 from slipping out of the bushing 8 as well preventing the retaining sleeve 10 from slipping into the corrugated hose 6, the retaining sleeve 10 is secured by a spring element 40. The spring element 40 engages in a retaining groove 42 which is admitted into the inner surface of the bushing 8 and is open in the direction of the inside space IN. The spring element 40, which is integrally formed in one piece on the retaining sleeve 10, has a direction of relief that is directed in the direction of the outside space AN. The retaining groove 42 extends in a radially circumferential manner in the bushing 8, and in this manner secures a rotation-invariant seat of the retaining sleeve 10 in the bushing 8.

Figure 2:
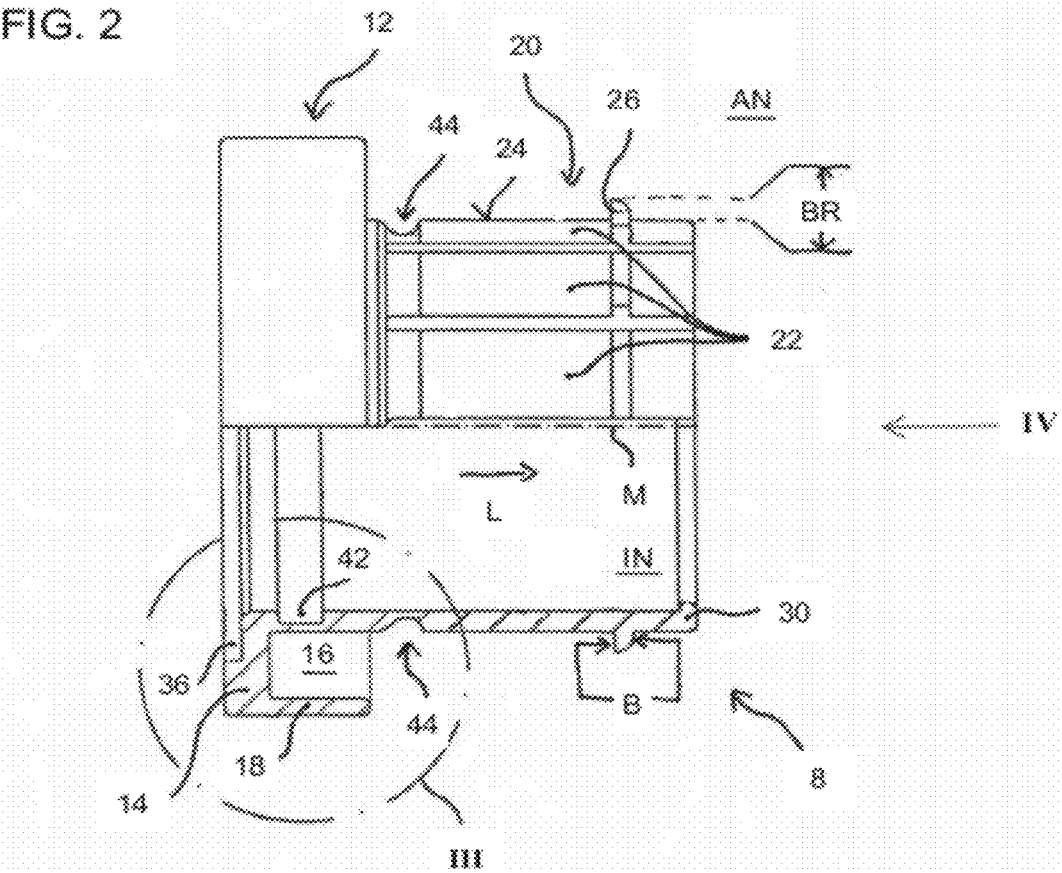
FIG. 2 is a diagrammatic, longitudinal sectional view of a bushing in one half and a top view in the other half.

FIG. 2 shows purely the bushing 8 that has already been shown in FIG. 1, a longitudinal section of the bushing being represented in the bottom part of the representation and a top view in the top part. The flexible tongues 22 are integrally formed in one piece on the bushing 8; in order to ensure the flexibility thereof in the radial direction, a tapering 44 is situated in the region of the transition between the actual body of the respective flexible tongue 22 and the bushing 8. The retaining groove 42, which runs round radially on the inner surface of the bushing 8 and into which the spring element 40 of the retaining sleeve 10 engages, is also easy to see.

Figure 3:
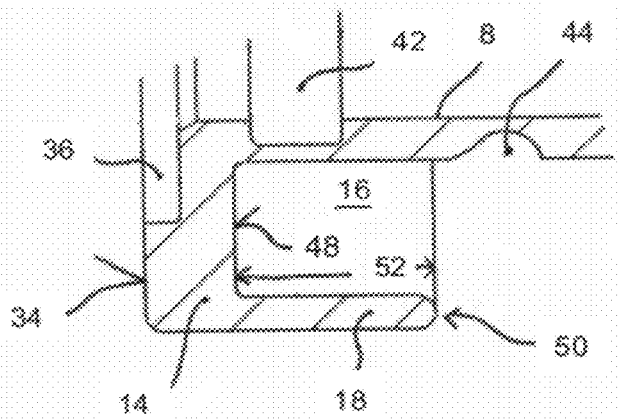
FIG. 3 is a diagrammatic, longitudinal sectional view of a detail of the bushing from FIG. 2.

FIG. 3 shows an enlarged view of the detail marked correspondingly in FIG. 2. Clearly visible is the groove 16, which is provided for accommodating the free end 4 of the corrugated hose 6, and the tapering 44 which ensures the elasticity of the flexible tongues 22. The radially circumferential outer jacket 18 of the collar 14 defines the groove 16 in the radial direction. A height 52 of the outer jacket 18 in the longitudinal direction L, which is measured between a bottom 48 of the groove 16 and a free end 50 of the outer jacket 18, is greater than a distance 54 (see FIG. 1) between adjacent undulations 28 of the corrugated hose 6. This dimensioning of the outer jacket 18 is responsible for the fact that the free end 4 of the corrugated hose 6 is always accommodated by the groove 16 of the bushing 8.

Figure 4:
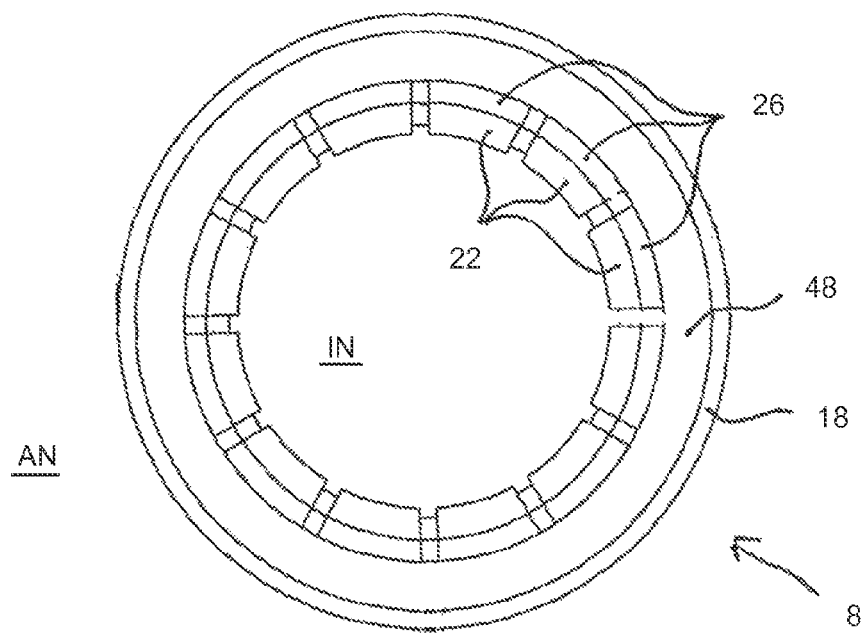
FIG. 4 is a diagrammatic, top view of the bushing shown in FIG. 2.

FIG. 4 shows a top view of the bushing 8 from the direction marked by IV in FIG. 2. Clearly visible is the groove 16 that is open in the longitudinal direction L now pointing at right angles to the plane of the paper. The observer looks directly onto the bottom 48 of the groove 16. The locking projections 26 present on the flexible tongues 22 extend on the outer surface 24 thereof in the circumferential direction substantially over the entire width of the flexible tongues 22.

Figure 5:
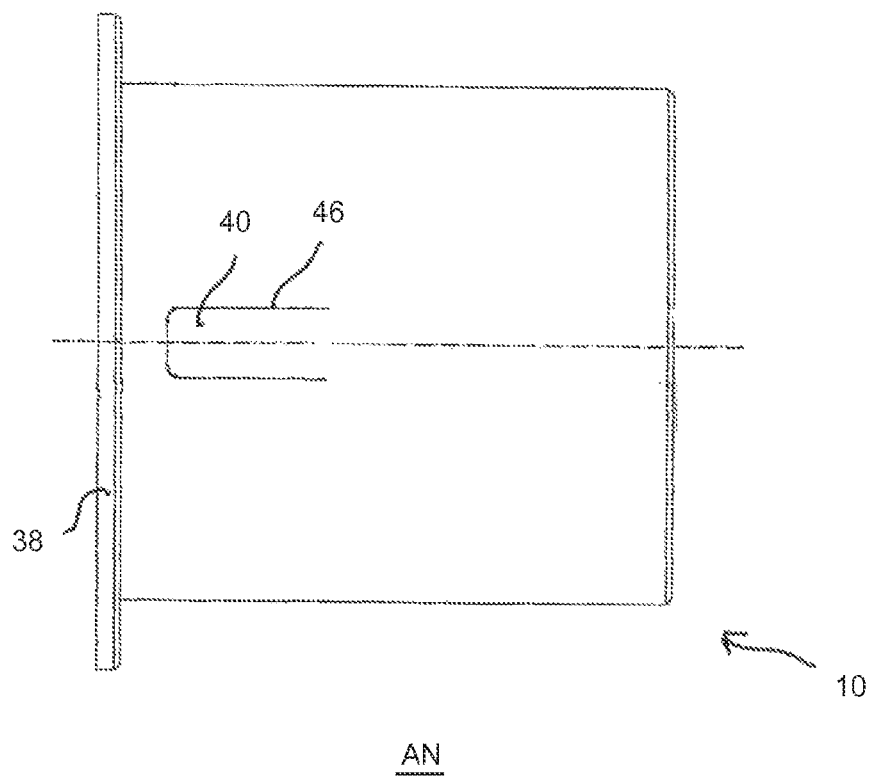
FIG. 5 is a diagrammatic, top view of a retaining sleeve.

FIG. 5 shows a top view of the retaining sleeve 10 that has already been shown in FIG. 1. The spring element 40, which secures the retaining sleeve 10 against slipping out of the bushing 8, is preferably cut out of the material of the retaining sleeve 10 by a laser cut 46. Once the laser cut has taken place, the lug created is deformed in such a manner that the spring element is created with a direction of relief that is directed in the direction of the outside space AN that is not surrounded by the retaining sleeve 10.

The end piece 2 and the corrugated hose 6 are preferably matched to each other, or an end piece that fits the respective corrugated hose 6 is selected. For example, an end piece 2 with a suitable diameter is selected. In addition, the form and size of the locking projections 26 of the end piece 2 are adapted to the undulation of the corrugated hose. Thus, the extent B of the locking projections 26 in the longitudinal direction L of the bushing 8 is selected such that it is smaller than the distance A (see FIG. 1) between two adjacent undulations 28 of the corrugated hose 6. These two sizes are preferably matched to each other with accuracy of fit. In order to make the mounting of the bushing 8 easier additionally, the locking projections 26 have a chamfer, which begins at the free ends of the locking projections 26 and faces the rear region 20 of the bushing 8. On account of the chamfer, when the bushing 8 is inserted into the corrugated hose 6, the locking projections 26 are easily able to snap over the individual undulations 28 of the corrugated hose 6 until finally the end position of the bushing 8 is obtained.

The invention claimed is:

1. An end piece for placing onto a free end of a corrugated hose, the end piece comprising:
 a bushing having a front region for facing the free end of the corrugated hose and a rear region lying opposite said front region in a longitudinal direction of said bushing, said bushing having an end face at said front region and, with said bushing in a mounted state, said bushing configured for being situated inside the corrugated hose, said bushing further having:
  a collar at said end face, said collar having an annular groove formed in a surface of said collar opposite said end face, for the at least partial accommodation of the free end of the corrugated hose;
  a plurality of flexible tongues disposed in said rear region, said flexible tongues have a direction of relief that is oriented perpendicular to the longitudinal direction of said bushing and is directed in the direction of the outside space of said bushing, at least part of said flexible tongues have on an outer surface thereof facing the outside space in each case at least one radially projecting locking projection for realizing an engagement-behind that is effective in the longitudinal direction of said bushing; and
 a retaining sleeve accommodated in said bushing and, with the end piece in the mounted state, extends over substantially an entire length of said bushing in the longitudinal direction of said bushing in an inside space and defines a radial play of said flexible tongues in the direction of the inside space of said bushing.

2. The end piece according to claim 1, where said retaining sleeve is accommodated in said bushing with accuracy of fit and limits the radial play of said flexible tongues in the direction of the inside space of said bushing to a distance that is smaller than a radial extent of said radially projecting locking projections in the direction of the outside space of said bushing.

3. The end piece according to claim 1, wherein said retaining sleeve, proceeding from said rear region of said bushing, extends along an inner surface facing the inside space of said bushing as far as into said front region of said bushing.

4. The end piece according to claim 1, wherein said retaining sleeve is held in said bushing so as not to be displaceable.

5. The end piece according to claim 4, wherein said bushing has a stop member, said retaining sleeve is secured against displacement in the direction of said rear region of said bushing by said stop member.

6. The end piece according to claim 5, wherein:
 said bushing has a projection disposed at said rear end of said bushing and extends radially in the direction of the inside space of said bushing;
 said retaining sleeve has a free end facing said rear end of said bushing; and
 said stop member is disposed between said projection and said free end of said retaining sleeve.

7. The end piece according to claim 6, wherein said projection that extends in the direction of the inside space and an inner surface of said retaining sleeve terminate in a form locking manner.

8. The end piece according to claim 6, wherein:
 said collar has a front end face;
 said bushing has a radially circumferential relief disposed at said front end face of said collar;
 said retaining sleeve having a flange disposed at said front free end of said retaining sleeve and projects radially in the direction of the outside space; and
 said stop member is disposed between said radially circumferential relief and said flange.

9. The end piece according to claim 8, wherein said flange has an end face terminating in a flush manner with said front end face of said collar.

10. The end piece according to claim 9, wherein:
 said bushing has a retaining groove formed therein;
 said retaining sleeve has at least one spring element engaging-behind in said retaining groove; and
 said retaining sleeve is secured against displacement in the direction of said front region of said bushing by said at least one spring element.

11. The end piece according to claim 10, wherein said at least one spring element disposed on said retaining bushing has a direction of relief that is directed in the direction of the outside space and said retaining groove is open in the direction of the inside space thereof.

12. The end piece according to claim 11, wherein said retaining groove extends in a radially circumferential manner, and is admitted into said bushing in the radially circumferential manner.

13. The end piece according to claim 1, wherein at least one of said locking projections has a chamfer which, beginning at a free end of said locking projection, extends in the direction of said rear region of said bushing.

14. A parts set, comprising:
 a corrugated hose having a free end and undulations;
 an end piece disposed on said free end of said corrugated hose, said end piece containing:
  a bushing having a front region facing said free end of said corrugated hose and a rear region lying opposite said front region in a longitudinal direction of said bushing, said bushing having an end face at said front region and, with said bushing in a mounted state, said bushing being situated inside said corrugated hose, said bushing further having:
   a collar at said end face, said collar having an annular groove formed in a surface of said collar opposite said end face, for the at least partial accommodation of the free end of the corrugated hose;
   a plurality of flexible tongues disposed in said rear region, said flexible tongues have a direction of relief that is oriented perpendicular to the longitudinal direction of said bushing and is directed in the direction of the outside space of said bushing, at least part of said flexible tongues have on an outer surface thereof facing the outside space in each case at least one radially projecting locking projection for realizing an engagement-behind that is effective in the longitudinal direction of said bushing;

a retaining sleeve accommodated by said bushing and, with said end piece in the mounted state, extends over substantially an entire length of said bushing in the longitudinal direction of said bushing in an inside space and defines a radial play of said flexible tongues in the direction of the inside space of said bushing; and an extent of said radially projecting locking projections in the longitudinal direction is smaller than a free space being present between adjacent said undulations of said corrugated hose, measured on an inside of said corrugated hose.

15. The parts set according to claim 14, wherein said collar of said end piece has a radially circumferential outer jacket, which extends in the direction of said rear region of said bushing and defines said groove in the direction of the outside space, wherein said outer jacket is dimensioned in such a manner that a distance between a bottom of said groove and a free end of said outer jacket is greater than a distance between adjacent said undulations of said corrugated hose.

16. A parts set, comprising:
a corrugated hose having a free end and undulations;
an end piece disposed on said free end of said corrugated hose, said end piece containing:
a bushing having a front region facing said free end of said corrugated hose and a rear region lying opposite said front region in a longitudinal direction of said bushing, said bushing having an end face at said front region and, with said bushing in a mounted state, said bushing being situated inside said corrugated hose, said bushing further having:
a collar at said end face, said collar having an annular groove formed in a surface of said collar opposite said end face, for the at least partial accommodation of the free end of the corrugated hose;
a plurality of flexible tongues disposed in said rear region, said flexible tongues have a direction of relief that is oriented perpendicular to the longitudinal direction of said bushing and is directed in the direction of the outside space of said bushing, at least part of said flexible tongues have on an outer surface thereof facing the outside space in each case at least one radially projecting locking projection for realizing an engagement-behind that is effective in the longitudinal direction of said bushing;
a retaining sleeve accommodated by said bushing and, with said end piece in the mounted state, extends over substantially an entire length of said bushing in the longitudinal direction of said bushing in an inside space and defines a radial play of said flexible tongues in the direction of the inside space of said bushing;
a free space being present between adjacent said undulations of said corrugated hose, measured on an inside of said corrugated hose, and said locking projections being dimensioned with accuracy of fit in relation to said free space.

17. The parts set according to claim 16, wherein said collar of said end piece has a radially circumferential outer jacket, which extends in the direction of said rear region of said bushing and defines said groove in the direction of the outside space, wherein said outer jacket is dimensioned in such a manner that a distance between a bottom of said groove and a free end of said outer jacket is greater than a distance between adjacent said undulations of said corrugated hose.

* * * * *